(12) United States Patent
Fu et al.

(10) Patent No.: US 8,507,179 B2
(45) Date of Patent: Aug. 13, 2013

(54) SWITCHABLE ANTIREFLECTIVE COATINGS

(75) Inventors: Peng-Fei Fu, Midland, MI (US); Eric Moyer, Midland, MI (US); Jason Suhr, Coleman, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 13/133,175

(22) PCT Filed: Oct. 19, 2009

(86) PCT No.: PCT/US2009/061131
§ 371 (c)(1),
(2), (4) Date: Jun. 7, 2011

(87) PCT Pub. No.: WO2010/068338
PCT Pub. Date: Jun. 17, 2010

(65) Prior Publication Data
US 2011/0236837 A1  Sep. 29, 2011

Related U.S. Application Data

(60) Provisional application No. 61/121,364, filed on Dec. 10, 2008.

(51) Int. Cl.
*G03F 7/00* (2006.01)
*G03F 7/11* (2006.01)

(52) U.S. Cl.
USPC .................................. 430/271.1; 430/270.1

(58) Field of Classification Search
USPC ............................................ 430/270.1, 271.1
See application file for complete search history.

(56) References Cited

U.S. PATENT DOCUMENTS

| | | | |
|---|---|---|---|
| 5,939,236 | A | 8/1999 | Pavelchek et al. |
| 6,268,457 | B1 | 7/2001 | Kennedy et al. |
| 6,395,397 | B2 | 5/2002 | Hong et al. |
| 6,503,689 | B2 | 1/2003 | Zampini et al. |
| 6,506,497 | B1 | 1/2003 | Kennedy et al. |
| 6,610,457 | B2 | 8/2003 | Kim et al. |
| 6,872,506 | B2 | 3/2005 | Neef et al. |
| 2003/0129531 | A1 | 7/2003 | Oberlander et al. |
| 2003/0166828 | A1 | 9/2003 | Cox et al. |
| 2004/0210034 | A1 | 10/2004 | Cox et al. |

(Continued)

FOREIGN PATENT DOCUMENTS

| EP | 1142928 | 2/2004 |
|---|---|---|
| EP | 1788011 | 5/2007 |

(Continued)

OTHER PUBLICATIONS

Schiavone et al., SiON based antireflective coating for 193nm lithography, Part of the SPIE Conference on Advances in Resist Technology and Processing XVI, SPIE vol. 3678, Mar. 1999, 391-395.

(Continued)

*Primary Examiner* — Amanda C. Walke
(74) *Attorney, Agent, or Firm* — Erika Takeuchi (57) ABSTRACT

An antireflective coating compositions comprising (I) a silsesquioxane resin (II) a compound selected from photo-acid generators and thermal acid generators; and (III) a solvent wherein in the silsesquioxane resin contains a carboxylic acid forming group or a sulfuric acid forming group.

12 Claims, 1 Drawing Sheet

(56) References Cited

U.S. PATENT DOCUMENTS

| | | | |
|---|---|---|---|
| 2007/0212886 A1* | 9/2007 | Uh et al. | 438/706 |
| 2007/0243484 A1 | 10/2007 | Chen et al. | |
| 2009/0171014 A1* | 7/2009 | Hergenrother et al. | 524/588 |
| 2009/0280438 A1* | 11/2009 | Kohno et al. | 430/323 |
| 2011/0003249 A1* | 1/2011 | Bradford et al. | 430/270.1 |
| 2011/0003480 A1* | 1/2011 | Fu et al. | 438/758 |
| 2011/0233489 A1* | 9/2011 | Fu et al. | 252/582 |
| 2011/0236835 A1* | 9/2011 | Fu et al. | 430/315 |

FOREIGN PATENT DOCUMENTS

| | | |
|---|---|---|
| EP | 1586603 | 6/2007 |
| EP | 1867681 | 12/2008 |
| EP | 1845132 | 1/2009 |
| EP | 2011830 | 1/2009 |
| WO | 2006065321 | 6/2006 |
| WO | WO 2008038602 A1 * | 4/2008 |
| WO | 2009091440 | 7/2009 |

OTHER PUBLICATIONS

Kennedy, J.; Baldwin-Hendrickes, T.; Stuck, J.; Suedmeyer, A.; Thanawala, S.; Do, K.; Iwamoto, N. "Organosiloxane based bottom antireflective coatings for 193nm lithography", Proceedings SPIE-Microlithography 2003, Advanceds in Resist Technology and Processing XX, 5039, 929-939.

Guerrero, D.J.; Proc. SPIE 5039, 129-135 (2003).

Guerrero, D.J.; Proc. SPIE 6519, Guerrero, D.J.; et al J. Photopol. Sci. Tec. 3, 343-347 (2003).

Katayama, T. ; et al, Proc. SPIE 5377, 968-973 (2004).

Owe-Yang, D. C.; et al, Proc. SPIE 5376, 452-460 (2004).

* cited by examiner

SWITCHABLE ANTIREFLECTIVE COATINGS

CROSS REFERENCE TO RELATED APPLICATIONS

This application is a U.S. national stage filing under 35 U.S.C. §371 of PCT Application No. PCT/US2009/061131 filed on 19 Oct. 2009, currently pending, which claims the benefit of U.S. Provisional Patent Application No. 61/121,364 filed 10 Dec. 2008 under 35 U.S.C. §119 (e). PCT Application No. PCT/US2009/061131 and U.S. Provisional Patent Application No. 61/121,364 are hereby incorporated by reference.

BACKGROUND

With the continuing demand for smaller feature sizes in the semiconductor industry, 193 nm optical lithography has emerged very recently as the technology to produce devices with sub-100 nm features. The use of such a shorter wavelength of light requires the bottom antireflective coating (BARC) to reduce the reflection on substrate and dampen the photoresist swing cure by absorbing light that has passed though the photoresist. Commercially available antireflective coatings consist of both organic and inorganic based materials. Typically, the inorganic ARC, which exhibits good etch resistance, is CVD based and is subject to all the integration disadvantage of extreme topography; on the other hand, the organic ARC materials are applied by spin-on process and have excellent fill and planarization properties, but suffer from poor etch selectivity to organic photoresists. As a result, a material that offers the combined advantages of organic and inorganic ARC is highly desired.

In this regards, we have recently discovered that certain phenyl-hydride based silsesquioxane resins exhibit excellent antireflective coating properties for 193 nm light. Although Bottom Anti Reflective Coatings (BARC) materials can effectively reduce the reflection of activating radiation, removal of BARC materials without damaging the overlying photoresist and/or the underlying substrate has been very challenging. The typical process to remove BARC is by a plasma etch process. Plasma etch often causes thinning of a photoresist layer. As a result, the patterns on the photoresist layer may be destroyed or becomes not transferable to the substrate layer. Plasma etch may also cause damage to the substrate thereby affecting the performance of the final device. What is more, the additional etch step for removing the BARC material increases cost and process complication in photolithographic practice.

Wet-etchable BARCs have been developed to address these issues. However, most of the wet-developable BARC materials are isotropic in nature, i.e, the entire layer of coating has an identical TMAH developing rate. This makes it difficult to obtain a vertical profile. As a result, anisotropically developing organic BARCs have been developed for 248 nm (KrF) and 193 nm (ArF) photolithography. These materials are initially insoluble in TMAH and become soluble after exposure to the wavelength of interest.

This invention pertains to switchable, wet-etchable antireflective coatings for photolithography produced from silsesquioxane resins. The antireflective coating (ARC) composition forms excellent spin-on film and are resistant to organic solvents, such as PGMEA, 2-heptonene, and TMAH, when cured at temperature 250° C. and below. With the addition of a photo-acid generator (PAG) to the ARC composition, the cured coating becomes soluble in developer solutions (TMAH) or stripper solutions (NE-89 and CCT-1) upon exposure to light through a photomask. The unexposed area of the ARC remains developer or stripper solution resistant. Secondly, when a thermo-acid generator (TAG) is added to the composition, the cured coating becomes developer-soluble (TMAH) upon exposure to the heat.

BRIEF SUMMARY

This invention pertains to antireflective coating compositions comprising
(I) a silsesquioxane resin comprised of the units and

(II) a compound selected from photo-acid generators and thermal acid generators; wherein in the silsesquioxane resin Ph is a phenyl group, Me is a methyl group; R' is hydrogen atom or a hydrocarbon group having from 1 to 4 carbon atoms; each R is selected from a carboxylic acid forming group or a sulfuric acid forming group and optionally trace amounts of the corresponding carboxylic acid or sulfuric acid; and each $R^1$ is independently selected from substituted phenyl groups, ester groups, polyether groups; mercapto groups, sulfur-containing organic functional groups, hydroxyl producing group, aryl sulphonic ester groups, and reactive or curable organic functional groups; and r has a value of 0, 1, 2, 3, or 4; x has a value of 0, 1 or 2; m has a value of 0 to 0.95; n has a value of 0.05 to 0.95; o has a value of 0 to 0.95; p has a value of 0.05 to 0.5; q has a value of 0 to 0.95; and m+n+o+p+q≈1. The coatings produced from the resins become wet-etchable upon the exposure of heat or radiation.

DETAILED DESCRIPTION

The silsesquioxane resins useful in forming the ARC are comprised of the units where Ph is a phenyl group, Me is a methyl group; R' is hydrogen atom or a hydrocarbon group having from 1 to 4 carbon atoms; each R is selected from a carboxylic acid forming group or a sulfuric acid forming group and optionally trace amounts of the corresponding carboxylic acid or sulfuric acid; and $R^1$ is selected from substituted phenyl groups, ester groups, polyether groups; mercapto groups, sulfur-containing organic functional groups, hydroxyl producing group, aryl sulphonic ester groups, and reactive or curable organic functional groups; and r has a value of 0, 1, 2, 3, or 4; x has a value of 0, 1 or 2; wherein in the resin m has a value of 0 to 0.90; n has a value of 0.05 to 0.99; o has a value of 0 to 0.95; p has a value of 0.01 to 0.5; q has a value of 0 to 0.5; and m+n+o+p+q≈1. Typically m has a value of 0.05 to 0.25, alternatively 0.05 to 0.15. Typically n has a value of 0.15 to 0.80, alternatively 0.2 to 0.75. Typically o has a value of 0.25 to 0.80, alternatively 0.4 to 0.75. Typically p has a value of 0.015 to 0.35, alternatively 0.025 to 0.25. Typically q has a value of 0 to 0.15, alternatively 0 to 0.1. The silsesquioxane resin may be a single resin or a blend of silsesquioxane resins.

R' is independently a hydrogen atom or hydrocarbon group having 1 to 4 carbon atoms. R' may be exemplified by H, methyl, ethyl, propyl, iso-propyl and butyl.

In the resin each R is selected from a carboxylic acid forming group or a sulfuric acid forming group and optionally trace amounts of the corresponding carboxylic acid or sulfuric acid. Examples of carboxylic acid forming groups are those of the general formula —$R^2C(O)OR^3$ where $R^2$ is selected from alkylene groups having 1-10 carbon atoms and polyether groups having the general formula —$(CH_2)_a[O(CH_2)_b]_f$— where a=1 to 12; b=2 to 6 and f=1 to 10 and $R^3$ is a protecting group. Examples of sulfuric acid forming groups are those of the general formula —$R^2SO_3R^3$ where $R^2$ and $R^3$ are as described above. Protecting groups are organic or silyl groups that cleave under acidic conditions to yield the corresponding carboxylic acid or sulfuric acid group. Protecting groups may be exemplified, but not limited, by t-butyl, trimethylsilyl, anhydride groups, methylthiomethyl ester, benzyloxymethyl ester, diphenylmethyl ester, p-methoxybenzyl ester, and others. Many of the protecting groups are described in "Protective groups in organic synthesis" by Greene and Wuts, $3^{rd}$ Edition, page 369-453.

Depending on how the resin is made, some of the carboxylic acid forming groups or sulfuric acid forming groups may be converted to the corresponding carboxylic acid or sulfuric acid. However, care should be taken in the manufacture of the resin to minimize the amount of acid groups in the resin to trace amounts. By trace amounts of carboxylic acid or sulfuric acid it is meant an amount such that the ARC is essentially not wet-etchable in the absence of a photo-acid generator or thermal acid generator.

$R^1$ is selected from substituted phenyl groups, ester groups, polyether groups; mercapto groups, sulfur-containing organic functional groups, hydroxyl producing group, aryl sulphonic ester groups, and reactive or curable organic functional groups. Substituted phenyl groups contain at least one HO—, MeO—, Me—, Et— Cl— and/or other substituents. Ester groups may be any organic substituent containing at least one ester functionality. Examples of ester groups useful herein are —$(CH_2)_2$—O—C(O)Me and —$(CH_2)_2$—C(O)—OMe. Polyether groups are an organic substituent having hydrocarbon units linked through oxygen atom, represented, but not limited, by the following structure: —$(CH_2)_a[O(CH_2)_b]_cOR^4$, wherein a=1 to 12; b=2 to 6; c=2 to 200; $R^4$=H, alkyl, or other organic groups. Examples of polyether groups useful herein are —$(CH_2)_3$—$(OCH_2CH_2)_c$—OMe, —$(CH_2)_3$—$(OCH_2CH_2)_c$—OH and —$(CH_2)_3$—$(OCH_2CH_2)_7$—OAc and —$(CH_2)_3$—$(OCH_2CH_2)_c$—OC(O)Me. Mercapto groups have the general formula $HS(CH_2)_d$— where d has a value of 1-18, such as mercaptopropyl, mercaptoethyl, and mercaptomethyl. Aryl sulfonic ester groups have the formula $R^5O$—$SO_2$-Ph-$(CH_2)_r$— where $R^5$ is a hydrogen atom, an aliphatic group or an aromatic group and r has a value of 0, 1, 2, 3, or 4. Aryl sulfonic ester groups may be exemplified by, but not limited to HO—$SO_2$-Ph-$(CH_2)_r$— or $(CH_3)_2CHO$—$SO_2$-Ph-$(CH_2)_r$—. Reactive or curable organic functional groups may be exemplified by, but not limited to alkenyl groups such as vinyl and allyl; epoxy groups such as glycidoxypropyl group and epoxycyclohexane group, acrylate groups such as methacryoxypropyl groups, acryloxypropyl, and others.

The typical method for producing the silsesquioxane resin involves the hydrolysis and condensation of the appropriate halo or alkoxy silanes. By this method it is possible that residual —OH and/or —OR' will remain in the silsesquioxane resin as a result of incomplete hydrolysis or condensation. If the total amount of units in the silsesquioxane resin containing —OR' groups, exceed 40 mole % then gellation and instability of the resin may occur. Typically the silsesquioxane resin contains 6 to 38 mole % of units containing —OR' groups, alternatively less than 5 mole %, alternatively less than 1 mole %.

The silsesquioxane resin has a weight average molecular weight (Mw) in the range of 500 to 200,000 alternatively in the range of 500 to 100,000, alternatively in the range of 700 to 30,0000 as determined by gel permeation chromatography employing RI detection and polystyrene standards.

One method for preparing a silsesquioxane resin comprises reacting water, $HSiX_3$, $RSiX_3$, and optionally $MeSiX_3$, $PhSiX_3$, ors $R^1SiX_3$ in an organic solvent, where X is a hydrolyzable group independently selected from Cl, Br, $CH_3CO_2$—, an alkoxy group —OR', or other hydrolyzable groups. The silanes useful herein can be exemplified by, but not limited to, $HSi(OEt)_3$, $HSiCl_3$, $PhCH_2CH_2SiCl_3$, and $PhSiCl_3$, $MeSi(OMe)_3$, $MeSiCl_3$, $R^1SiCl_3$ and $R^1Si(OMe_3)_3$ where $R^1$ is as defined above, Me represents a methyl group, Et represents an ethyl group and Ph represents a phenyl group.

Silanes having a carboxylic acid forming group that may be used in the preparation of the silsesquioxane resin, may be exemplified by, but not limited to, (MeO)$_3$Si—(CH$_2$)$_2$—COO$^t$Bu (MeO)$_3$Si—(CH$_2$)$_e$—(OCH$_2$CH$_2$)$_f$—COO$^t$Bu

(MeO)$_3$Si—(CH$_2$)$_2$—COO—SiMe$_3$ (MeO)$_3$Si—(CH$_2$)$_e$—(OCH$_2$CH$_2$)$_f$—COO—SiMe$_3$ wherein Me is a methyl group, $^t$Bu is a t-butyl group, e has a value of 1, 2 or 3 and f has a value of 1 to 10.

Silanes having a sulfuric acid forming group that may be used in the preparation of the silsesquioxane resin, may be exemplified by, but not limited to, where e has a value of 1, 2 or 3, f has a value of 1 to 10 and $R^6$ is selected from t-butyl, trimethylsilyl, triphenylmethyl, tetrahydropyranyl, or benzyloxymethyl.

The amount of water in the reaction is typically in the range of 0.5 to 2 moles water per mole of X groups in the silane reactants, alternatively 0.5 to 1.5 moles per mole of X groups in the silane reactants.

The time to form the silsesquioxane resin is dependent upon a number of factors such as the temperature, the type and amount of silane reactants, and the amount of catalyst, if present. It is preferred to carry out the reaction for a time sufficient for essentially all of the X groups to undergo hydrolysis reactions. Typically the reaction time is from minutes to hours, alternatively 10 minutes to 1 hour. The reaction to produce the silsesquioxane resin can be carried out at any temperature so long as it does not cause significant gellation or cause curing of the silsesquioxane resin. The temperature at which the reaction is carried out is typically in the range of 25° C. up to the reflux temperature of the reaction mixture. Typically the reaction is carried out by heating under reflux for 10 minutes to 1 hour.

The reaction step comprises both hydrolyzing and condensing the silane components. To facilitate the completion of the reaction a catalyst may be used. The catalyst can be a base or an acid such as a mineral acid. Useful mineral acids include, but are not limited to, HCl, HF, HBr, $HNO_3$, and $H_2SO_4$, among others, typically HCl. The benefit of HCl or other volatile acids is that a volatile acid can be easily removed from the composition by stripping after the reaction is completed. The amount of catalyst may depend on its nature. The amount of catalyst is typically 0.05 wt % to 1 wt % based on the total weight of the reaction mixture.

Generally, the silane reactants are either not soluble in water or sparingly soluble in water. In light of this, the reaction is carried out in an organic solvent. The organic solvent is present in any amount sufficient to dissolve the silane reactants. Typically the organic solvent is present from 1 to 99 weight percent, alternatively 70 to 90 wt % based on the total weight of the reaction mixture. Useful organic solvents may be exemplified by, but not limited to, saturated aliphatics such as n-pentane, hexane, n-heptane, and isooctane; cycloaliphatics such as cyclopentane and cyclohexane; aromatics such as benzene, toluene, xylene, mesitylene; ethers such as tetrahydrofuran, dioxane, ethylene glycol dietheyl ether, ethylene glycol dimethyl ether; ketones such as methylisobutyl ketone (MIBK) and cyclohexanone; halogen substituted alkanes such as trichloroethane; halogenated aromatics such as bromobenzene and chlorobenzene; esters such as propylene glycol monomethyl ether acetate (PGMEA), isobutyl isobutyrate and propyl propionate. Useful silicone solvents may be exemplified by, but not limited to cyclic siloxanes such as octamethylcyclotetrasiloxane, and decamethylcyclopentasiloxane. A single solvent may be used or a mixture of solvents may be used.

In the process for making the silsesquioxane resin, after the reaction is complete, volatiles may be removed from the silsesquioxane resin solution under reduced pressure. Such volatiles include alcohol by-products, excess water, catalyst, hydrochloric acid (chlorosilanes routes) and solvents. Methods for removing volatiles are known in the art and include, for example, distillation or stripping under reduced pressure.

Following completion of the reaction the catalyst may be optionally removed. Methods for removing the catalyst are well know in the art and would include neutralization, stripping or water washing or combinations thereof. The catalyst may negatively impact the shelf life of the silsesquioxane resin especially when in solution thus its removal is suggested.

To increase the molecular weight of the silsesquioxane resin and/or to improve the storage stability of the silsesquioxane resin the reaction may be carried out for an extended period of time with heating from 40° C. up to the reflux temperature of the solvent ("bodying step"). The bodying step may be carried out subsequent to the reaction step or as part of the reaction step. Typically, the bodying step is carried out for a period of time in the range of 10 minutes to 6 hours, alternatively 20 minutes to 3 hours.

Following the reaction to produce the silsesquioxane resin a number of optional steps may be carried out to obtain the silsesquioxane resin in the desired form. For example, the silsesquioxane resin may be recovered in solid form by removing the solvent. The method of solvent removal is not critical and numerous methods are well known in the art (e.g. distillation under heat and/or vacuum). Once the silsesquioxane resin is recovered in a solid form, the resin can be optionally re-dissolved in the same or another solvent for a particular use. Alternatively, if a different solvent, other than the solvent used in the reaction, is desired for the final product, a solvent exchange may be done by adding a secondary solvent and removing the first solvent through distillation, for example. Additionally, the resin concentration in solvent can be adjusted by removing some of the solvent or adding additional amounts of solvent.

Another method for producing the silsesquioxane resin comprises grafting onto a starting silsesquioxane resin the corresponding monomer containing a carboxylic or sulfuric acid forming group. The typical method for grafting the monomer onto the silsesquioxane resin is by the hydrosilylation of a Si—H containing silsesquioxane resin and olefin containing a carboxylic or sulfuric acid forming group in the presence of a transition metal catalyst.

Olefins containing a carboxylic acid forming group useful herein include organic molecules that contain a double bond and a carboxylic acid forming group, —$COOR^3$ where $R^3$ is as described above. Olefins containing a sulfuric acid forming group useful herein include organic molecules that contain a double bond and a sulfuric acid forming group, —$SO_3R^3$ where R3 is as described above.

Olefins containing a carboxylic acid forming group useful herein include, but are not limited to, where $R^3$ can be $^tBu$, $SiMe_3$, $Si^tBuMe_2$, or $CPh_3$; and g=0 to 8;

where g=0 to 8;

where R can be $^tBu$, $SiMe_3$, $Si^tBuMe_2$, or $CPh_3$; g=0 to 8 and f has a value of 1 to 10; or Olefins containing a sulfuric acid forming group useful herein include, but are not limited to, $$CH_2=CH-(CH_2)_e-(OCH_2CH_2)_f-SO_2-OR^6$$

$$CH_2=CH-(CH_2)_e-SO_2-OR^6$$

where a' has a value of 1, 2 or 3, f has a value of 1 to 10 and $R^3$ is selected from t-butyl, trimethylsilyl, triphenylmethyl, tetrahydropyranyl, or benzyloxymethyl.

SiH containing silsesquioxane resins useful in the production of the silsesquioxane resins herein are comprised of are comprised of the units $$(Ph(CH_2)_rSiO_{(3-x)/2}(OR')_x)_m$$

$$(HSiO_{(3-x)/2}(OR')_x)_{n''}$$

$$(MeSiO_{(3-x)/2}(OR')_x)_o$$

$$(R^1SiO_{(3-x)/2}(OR')_x)_q$$

where Ph is a phenyl group, Me is a methyl group; R' is hydrogen atom or a hydrocarbon group having from 1 to 4 carbon atoms; and $R^1$ is selected from substituted phenyl groups, ester groups, polyether groups; mercapto groups, sulfur-containing organic functional groups, hydroxyl producing group, aryl sulphonic ester groups, and reactive or curable organic functional groups; and r has a value of 0, 1, 2, 3, or 4; x has a value of 0, 1 or 2; wherein in the resin m has a value of 0 to 0.90; n" has a value of 0.10 to 1; o has a value of 0 to 0.95; q has a value of 0 to 0.5; and m+n"+o+q≈1.

Typically m has a value of 0.05 to 0.25, alternatively 0.05 to 0.15. Typically n" has a value of 0.165 to 0.95, alternatively 0.225 to 0.95. Typically o has a value of 0.25 to 0.80, alternatively 0.25 to 0.75. Typically q has a value of 0 to 0.15, alternatively 0 to 0.1.

The olefin containing a carboxylic acid or sulfuric acid forming group and Si—H containing silsesquioxane resin are reacted in the presence of a transition metal catalyst. Useful transition metal catalysts may be selected from a variety of hydrosilylation catalysts known to promote the reaction of vinyl functional radicals with silicon-bonded hydrogen atoms. Suitable transition metal catalyst may include platinum and rhodium-containing compounds and complexes. Platinum catalysts such as platinum acetylacetonate or chloroplatinic acid are representative of these compounds and suitable for use. A typical transition metal catalyst is a chloroplatinic acid complex of divinyltetramethyldisiloxane diluted in dimethylvinylsiloxy endblocked polydimethylsiloxane.

The amount of olefin containing a carboxylic acid or sulfuric acid forming group to Si—H containing silsesquioxane resin is typically such that the final resin contains 5 to 95 mole % of $(HSiO_{(3-x)/2}(OR')_x)$ and 0.5 to 50 mole % of $(RSiO_{(3-x)/2}(OR')_x)$, alternatively 15 to 80 mole % of $(HSiO_{(3-x)/2}(OR')_x)$ and 1.5 to 35 mole % of $(RSiO_{(3-x)/2}(OR')_x)$, alternatively 20 to 75 mole % of $(HSiO_{(3-x)/2}(OR')_x)$ and 2.5 to 25 mole % of $(RSiO_{(3-x)/2}(OR')_x)$. The amount of transition metal catalyst used is typically present in an amount to provide 2 ppm, alternatively 5 to 200 ppm of transition metal (i.e. Pt) based on the total weight olefin containing a carboxylic acid or sulfuric acid forming group and Si—H containing silsesquioxane.

The ARC composition also contains a compound selected from photo-acid generators (PAG) and thermal acid generators (TAG). Typically the PAG or TAG is present in an amount of 0.2-5 wt % based on the weight of the ARC composition.

Photo-acid generators are known in the art. The photo-acid generator is a compound that causes the acid forming group in the silsesquioxane resin to produce the corresponding acid upon exposure to radiation. This in turn makes the ARC coating wet-etchable. Photo-acid generators are well known in the art and are described in, for example, EP 1 142 928 A1. Photo-acid generators may be exemplified by, but not limited to, onium salts, halogen-containing compounds, diazoketone compounds, sulfone compounds, sulfonate compounds and others. The photo-acid generator may be used either individually or in combination of two or more.

Examples of onium salts include, but are not limited to, iodonium salts, sulfonium salts (including tetrahydrothiophenium salts), phosphonium salts, diazonium salts, and pyridinium salts.

Examples of halogen-containing compounds include, but are not limited to, haloalkyl group-containing hydrocarbon compounds, haloalkyl group-containing heterocyclic compounds, and others.

Examples of diazoketone compounds include, but are not limited to, 1,3-diketo-2-diazo compounds, diazobenzoquinone compounds, diazonaphthoquinone compounds, and others.

Examples of sulfone compounds, include, but are not limited to, ketosulfone, sulfonylsulfone, diazo compounds of these compounds, and others.

Examples of sulfonate compounds include, but are not limited to, alkyl sulfonate, alkylimide sulfonate, haloalkyl sulfonate, aryl sulfonate, imino sulfonate, and others.

Thermal acid generators are also known in the art. The thermal acid generator is a compound that causes the acid forming group in the silsesquioxane resin to produce the corresponding acid upon exposure to heat. This in turn makes the ARC coating wet-etchable. The TAG may be used either individually or in combination of two or more. Typically the thermal acid generator is activated at above 90° C. and more preferably at above 120° C., and even more preferably at above 150° C.

Examples of thermal acid generators are metal-free iodonium and sulfonium salts. Other examples of TAGs are nitrobenzyl tosylates, such as 2-nitrobenzyl tosylate, 2,4-dinitrobenzyl tosylate, 2,6-dinitrobenzyl tosylate, 4-nitrobenzyl tosylate; benzenesulfonates such as 2-trifluoromethyl-6-nitrobenzyl 4-chlorobenzenesulfonate, 2-trifluoromethyl-6-nitrobenzyl 4-nitro benzenesulfonate; phenolic sulfonate esters such as phenyl, 4-methoxybenzenesulfonate; alkyl ammonium salts of organic acids, such as triethylammonium salt of 10-camphorsulfonic acid. Iodo- nium salts can be exemplified by iodonium fluorosulfonates, iodonium tris(fluorosulfonyl)methide, iodonium bis(fluorosulfonyl)methide, iodonium bis(fluorosulfonyl)imide, iodonium quaternary ammonium fluorosulfonate, iodonium quaternary ammonium tris(fluorosulfonyl)methide, and iodonium quaternary ammonium bis(fluorosulfonyl)imide.

The ARC composition may contain a solvent. Useful solvents (ii) include, but are not limited to, 1-methoxy-2-propanol, propylene glycol monomethyl ethyl acetate, gamma-butyrolactone, and cyclohexanone, among others. The ARC composition typically comprises from 10% to 99.9 wt % solvent based on the total weight of the ARC composition, alternatively 80 to 95 wt %.

The ARC compositions are formed by mixing together the silsesquioxane resin, solvent, the compound selected from a PAG or a TAG and optionally any other additive.

The antireflective coating is formed on an electronic device by a method comprising
(A) applying to an electronic device an ARC composition comprising
(I) a silsesquioxane resin comprised of the units (II) a compound selected from photo-acid generators and thermal acid generators; and
(III) a solvent,
(B) removing the solvent and curing the silsesquioxane resin to form an antireflective coating on the electronic device.

wherein in the silsesquioxane resin Ph is a phenyl group, Me is a methyl group; R' is hydrogen atom or a hydrocarbon group having from 1 to 4 carbon atoms; each R is selected from a carboxylic acid forming group or a sulfuric acid forming group and optionally trace amounts of the corresponding carboxylic acid or sulfuric acid; and each $R^1$ is independently selected from i substituted phenyl groups, ester groups, polyether groups; mercapto groups, sulfur-containing organic functional groups, hydroxyl producing group, aryl sulfonic ester groups, and reactive or curable organic functional groups; and r has a value of 0, 1, 2, 3, or 4; x has a value of 0, 1 or 2; m has a value of 0 to 0.95; n has a value of 0.05 to 0.95; o has a value of 0 to 0.95; p has a value of 0.05 to 0.5; q has a value of 0 to 0.95; and $m+n+o+p+q\approx1$.

The ARC composition is applied to an electronic device to produce a coated substrate. The solvent is removed and the silsesquioxane resin is cured to produce the ARC on the electronic device.

Typically the electronic device is a semiconductor device, such as silicon-based devices and gallium arsenide-based devices intended for use in the manufacture of a semiconductor component. Typically, the device comprises at least one semiconductive layer and a plurality of other layers comprising various conductive, semiconductive, or insulating materials.

Specific methods for application of the ARC composition to the electronic device include, but are not limited to, spin-coating, dip-coating, spay-coating, flow-coating, screen-printing and others. The preferred method for application is spin coating. Typically, coating involves spinning the electronic device, at 1,000 to 2,000 RPM, and adding the ARC composition to the surface of the spinning electronic device.

The solvent is removed and the silsesquioxane resin is cured to form the ARC on the electronic device. Curing generally comprises heating the coating to a sufficient temperature for a sufficient duration to lead to curing. Curing occurs when sufficient crosslinking has taken place such that the silsesquioxane resin is essentially insoluble in the solvent from which it was applied. Curing may take place for example by heating the coated electronic device at 80° C. to 450° C. for 0.1 to 60 minutes, alternatively 150° C. to 275° C. for of 0.5 to 5 minutes, alternatively 200° C. to 250° C. for 0.5 to 2 minutes. Any method of heating may be used during the curing step. For example, the coated electronic device may be placed in a quartz tube furnace, convection oven or allowed to stand on hot plates.

To protect the silsesquioxane resin of the coated composition from reactions with oxygen or carbon during curing, the curing step can be performed under an inert atmosphere. Inert atmospheres useful herein include, but are not limited to nitrogen and argon. By "inert" it is meant that the environment contain less than 50 ppm and alternatively less than 10 ppm of oxygen. The pressure at which the curing and removal steps are carried out is not critical. The curing step is typically carried out at atmospheric pressure although sub or super atmospheric pressures may work also.

If the ARC composition contains a TAG, the coating will be wet-etchable after the heat cure step. If the ARC composition contains a PAG, an additional step of exposing the ARC to radiation will be required to make the coating wet-etchable.

Typically the ARC after cure is insoluble in photoresist casting solvents. These solvents include, but are not limited to esters and ethers such at propylene glycol methyl ether acetate (PGMEA) and ethoxy ethyl propionate (EPP). By insoluble it is meant that when the ARC is exposed to the solvent, there is little or no loss in the thickness of the coating after exposure for 1 minute. Typically the loss in the thickness of the coating is less than 10% of the coating thickness, alternatively less than 7.5% of the coating thickness.

This invention also pertains to a method comprising
(a) forming a antireflective coating on a substrate;
(b) forming a resist coating over the antireflective coating
(c) exposing the resist to radiation;
(d) developing the resist and the antireflective coating;
wherein the antireflective coating is produced from an ARC composition comprising
I) a silsesquioxane resin comprised of the units (II) a compound selected from photo-acid generators and thermal acid generators;
where Ph is a phenyl group, Me is a methyl group; R' is hydrogen atom or a hydrocarbon group having from 1 to 4 carbon atoms; each R is selected from a carboxylic acid forming group or a sulfuric acid forming group and optionally trace amounts of the corresponding carboxylic acid or sulfuric acid; and $R^1$ is selected from substituted phenyl groups, ester groups, polyether groups; mercapto groups, sulfur-containing organic functional groups, hydroxyl producing group, aryl sulphonic ester groups, and reactive or curable organic functional groups; and r has a value of 0, 1, 2, 3, or 4; x has a value of 0, 1 or 2; wherein in the resin m has a value of 0 to 0.90; n has a value of 0.05 to 0.99; o has a value of 0 to 0.95; p has a value of 0.01 to 0.5; q has a value of 0 to 0.5; and m+n+o+p+q≈1.

Alternatively this invention also pertains to a method comprising (a) applying an antireflective coating composition comprising a silsesquioxane resin and a thermal acid generator on a substrate;

(b) thermally curing the antireflective coating composition to produce a wet-etchable antireflective coating.

(c) forming a resist coating over the antireflective coating;

(d) exposing the resist to radiation;

(e) developing the resist and the antireflective coating;

Alternatively this invention also pertains to a method comprising (a) forming an antireflective coating on a substrate wherein the ARC composition comprises a silsesquioxane resin and a photo-acid generator;

(b) forming a resist coating over the antireflective coating;

(c) exposing the resist and ARC to radiation;

(d) developing the resist and the antireflective coating.

Alternatively this invention also pertains to a method comprising (a) forming an antireflective coating on a substrate wherein the ARC composition comprises a silsesquioxane resin and a photo-acid generator;

(b) exposing the ARC to radiation to produce a wet-etchable antireflective coating;

(c) forming a resist coating over the antireflective coating;

(d) exposing the resist to radiation;

(e) developing the resist and the antireflective coating.

The ARC is formed as described above. A resist coating is then formed over the antireflective coating. This resist layer can be formed using any known resist materials and method for forming. Typically the resist materials are applied from a solvent solution in a manner similar to producing the ARC herein. The resist coating may be baked to remove any solvent. Depending on the source used for baking, the baking typically occurs by heating the coating to a temperature of 90° C. to 130° C. for several minutes to an hour or more.

After the resist layer is formed it is then exposed to radiation, i.e., UV, X-ray, e-beam, EUV, or the like. Typically ultraviolet radiation having a wavelength of 157 nm to 365 nm is used alternatively ultraviolet radiation having a wavelength of 157 nm or 193 nm is used. Suitable radiation sources include mercury, mercury/xenon, and xenon lamps. The preferred radiation source is a KrF excimer laser (248 nm) or a ArF excimer laser (193 nm). At longer wavelength radiation is used, e.g., 365 nm, it is suggested to add a sensitizer to the photoresist composition to enhance absorption of the radiation. Full exposure of the photoresist composition is typically achieved with less than 100 mJ/cm$^2$ of radiation, alternatively with less than 50 mJ/cm$^2$ of radiation. Typically the resist layer is exposed through a mask forming a pattern on the coating.

Upon exposure to radiation, the radiation is absorbed by the acid generator in the resist composition to generate free acid. When the resist composition is a positive resist, upon heating, the free acid causes cleavage of acid dissociable groups of the resist. When the resist composition is a negative resist, the free acid causes the crosslinking agents to react with resist, thereby forming insoluble areas of exposed resist. After the resist layer has been exposed to radiation, the resist composition is typically undergoes a post-exposure bake by heating to a temperature in the range of 30° C. to 200° C., alternatively 75° C. to 150° C. for a short period of time, typically 30 seconds to 5 minutes, alternatively 60 to 90 seconds.

If the ARC composition contains a PAG, the exposure of the resist to radiation will also cause the ARC to become wet-etchable. Alternatively, if the ARC composition contains a PAG, the ARC may be exposed to radiation prior to the forming of the resist layer.

The exposed resist and the ARC are removed with a suitable developer or stripper solution to produce an image. Because the antireflective coatings are wet-etchable they may be removed at the same time that the exposed resist is removed, thereby eliminating the need for a separate etch step to remove the antireflective coating. Suitable developer solutions typically contain an aqueous base solution, preferably an aqueous base solution without metal ions, and optionally an organic solvent. One skilled in the art will be able to select the appropriate developer solution. Standard industry developer solutions may be exemplified by, but not limited to organic alkalis such as sodium hydroxide, potassium hydroxide, sodium carbonate, sodium silicate, sodium metasilicate and aqueous ammonia, primary amines such as ethylamine and n-propylamine, secondary amines such as diethylamine and di-n-butylamine, tertiary amines such as triethylamine and methyldiethylamine, alcoholamines such as dimethylethanolamine and triethanolamine, quaternary ammonium salts such as tetramethylammonium hydroxide, tetraethylammonium hydroxide and choline, and cyclic amines such as pyrrole and piperidine. Typically, solutions of quaternary ammonium salt such as tetramethylammonium hydroxide (TMAH) or choline are used. Suitable fluoride-based stripping solutions include but are not limited to NE-89 and CCT-1. After the exposed film has been developed, the remaining resist film ("pattern") is typically washed with water to remove any residual developer solution.

The pattern produced in the resist and ARC layers may then be transferred to the material of the underlying substrate. In coated or bilayer photoresists, this will involve transferring the pattern through the coating that may be present and through the underlayer onto the base layer. In single layer photoresists the transfer will be made directly to the substrate. Typically, the pattern is transferred by etching with reactive ions such as oxygen, plasma, and/or oxygen/sulfurdioxide plasma. Suitable plasma tools include, but are not limited to, electron cyclotron resonance (ECR), helicon, inductively coupled plasma, (ICP) and transmission-coupled plasma (TCP) system. Etching techniques are well known in the art and one skilled in the art will be familiar with the various commercially available etching equipments.

Additional steps or removing the resist film and remaining ARC may be employed to produce a device having the desired architecture.

The ARC compositions of the invention can be used to create patterned material layer structures such as metal wiring lines, holes for contacts or vias, insulation sections (e.g., damascene trenches or shallow trench isolation), trenches for capacitor structures, etc. as might be used in the design of integrated circuit devices. Such processes for making these features are known in the art.

Figures 1, 2, 3:
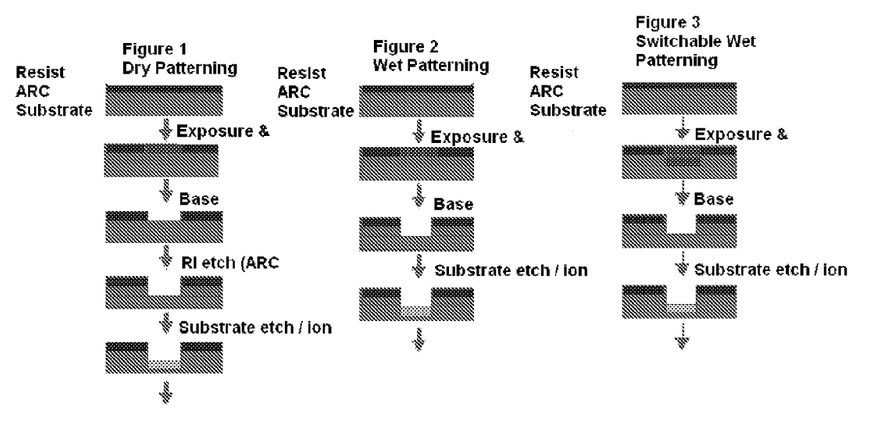
FIG. 1 shows a traditional dry patterning process using a resist layer and an antireflective coating layer.
FIG. 2 shows a wet patterning process using a resist layer and the antireflective coating layer.
FIG. 3 shows a wet patterning process using a resist layer and the antireflective coating described herein.

FIG. 1 shows the traditional dry patterning process involving an antireflective coating. This process involves forming a resist coating over the antireflective coating. The resist coating is exposed using an exposure device and mask, followed by a post exposure bake (PEB). The resist layer is then developed using a solution of alkali (wet development). The ARC is then removed using typically processes such as RI (etch) to expose the substrate. The substrate is then subjected to typical processes such as substrate etch and/or ion implant.

FIG. 2 show a typical wet patterning involving antireflective coating. This process involves forming a resist coating over the antireflective coating. The resist coating is exposed using an exposure device, followed by a post exposure bake (PEB). The resist coating and ARC are then simultaneously wet-developed using a base solution. The substrate is then subjected to typical processes such as substrate etch and/or ion implant.

FIG. 3 shows a wet patterning process involving the antireflective coating composition described herein comprising a PAG. This process involves forming a resist coating over the antireflective coating. The resist coating and ARC are exposed using an exposure device, followed by a post exposure bake (PEB). The resist coating and ARC are then simultaneously wet-developed using a base solution. The substrate is then subjected to typical processes such as substrate etch and/or ion implant.

EXAMPLES

The following examples are included to demonstrate embodiments of the invention. It should be appreciated by those of skill in the art that the techniques disclosed in the examples which follow represent techniques discovered by the inventor to function well in the practice of the invention. However, those of skill in the art should, in light of the present disclosure, appreciate that many changes can be made in the specific embodiments which are disclosed and still obtain a like or similar result without departing from the spirit and scope of the invention. All percentages are in wt. %. Structures given in Examples 1-6 are theoretical structures based on the reactants.

Example 1

$T^{(Ph)}_{0.07}T^{(H)}_{0.45}T^{(Me)}_{0.36}T^{(COOtBu)}_{0.12}$

PGMEA (600 g), phenyltrimethoxysilane (13.9 g, 0.07 mol), triethoxysilane (73.9 g. 0.45 mol), methyltriethoxysilane (64.2 g, 0.36 mol), (3-tert-butyl)propyl trimethoxysilane (31.7 g, 0.12 mol), and de-ionized water (54 g, 3 mol) were loaded into a flask. The solution was stirred for 5 min at room temperature and followed by the addition of nitric acid (70%, 0.64 g). The mixture was stirred overnight at 80° C. and then refluxed for 4 hrs, whereby low boiling volatiles were removed. The solution was cooled to room temperature to yield a clear colorless solution. The solution is then washed with DI-water. The residual water was stripped along with some PGMEA. The solution is diluted with PGMEA to a 10% solution in PGMEA. GPC (vs. PS): $M_w$=6300; $M_w/M_n$=2.58.

Example 2-4

The resin from Example 1 was formulated with the addition of either photoacid generator or thermal acid generator (TAG) at the indicated concentration in Table 1. The solution was spin-coated on a 4" silicon wafer and cured at 250° C. for 1 minute. PGMEA loss after cure was determined by measuring the film thickness change before and after PGMEA rinse. TMAH loss after cure was determined by measuring the film thickness change before and after the wafer was immersed for 1 minute in 0.26 N of TMAH solution. The results are in Table 1.

Example 5

$T^{(Ph)}_{0.10}T^{(H)}_{0.20}T^{(Me)}_{0.625}T^{(COOtBu)}_{0.075}$

PGMEA (600 g), phenyltrimethoxysilane (19.8 g, 0.10 mol), triethoxysilane (32.8 g. 0.20 mol), methyltriethoxysilane (111.4 g, 0.625 mol), (3-tert-butyl)-propyl trimethoxysilane (19.8 g, 0.075 mol), and de-ionized water (54 g, 3 mol) were loaded into a flask. The solution was stirred for 5 min at room temperature and followed by the addition of nitric acid (70%, 0.64 g). The mixture was stirred overnight at 80° C. and then refluxed for 4 hrs, whereby low boiling volatiles were removed. The solution was cooled to room temperature to yield a clear colorless solution. The solution is then washed with DI-water. The residual water was stripped along with some PGMEA using a rotovap. The solution is diluted with PGMEA to a 10% solution in PGMEA. GPC (vs. PS):

$M_w$=5300; $M_w/M_n$=2.45.

Examples 6-8

The resin from example 5 was formulated with the addition of either photoacid generator (PAG, such as UV-9820) or thermo-acid generator (TAG) at the indicated concentration in Table 1. The solution was spin-coated on a 4" silicon wafer and cured at 250° C. for 1 minute. PGMEA loss after cure was determined by measuring the film thickness change before and after PGMEA rinse. TMAH loss after cure was determined by measuring the film thickness change before and after the wafer was immersed for 1 minute in 0.26 N of TMAH solution. The results are in Table 1.

TABLE 1

Examples of switchable or anisotropic developable SSQ resins

| Example | Composition | Additive[a] | Wt % in solution | Th (Å) | SD | Film Loss by PGMEA[b] (Å) | Film Loss by TMAH[c] (Å) |
|---|---|---|---|---|---|---|---|
| 1 | $T^{(Ph)}_{0.07}T^{(H)}_{0.45}T^{(Me)}_{0.36}T^{(COOtBu)}_{0.12}$ | None | 0% | 2176 | 5.1 | −2 | |
|   |   |   |   | 2219 | 11.1 |   | 89 |
| 2 |   | UV-9820 | 1.28% | 1840 | 4.5 | 22 | |
|   |   |   |   | 1852 | 6.1 |   | 535 |
| 3 |   | TAG-2172 | 1% | 2455 | 7.7 | 10 | |
|   |   |   |   | 2456 | 7.2 |   | 1504 |
| 4 |   | TAG-2507 | 1% | 2390 | 8.6 | 11 | |
|   |   |   |   | 2414 | 9.1 |   | 1777 |
| 5 | $T^{(Ph)}_{0.10}T^{(H)}_{0.20}T^{(Me)}_{0.625}T^{(COOtBu)}_{0.075}$ | None | 0 | 2127 | 3.0 | 3 | |
|   |   |   |   | 2290 | 21.0 |   | 83 |
| 6 |   | UV-9820 | 1.5% | 2139 | 3.6 | 97 | |
|   |   |   |   | 2154 | 1.7 |   | 429 |

TABLE 1-continued

Examples of switchable or anisotropic developable SSQ resins

| Example | Composition | Additive[a] | Wt % in solution | Th (Å) | SD | Film Loss by PGMEA[b] (Å) | Film Loss by TMAH[c] (Å) |
|---|---|---|---|---|---|---|---|
| 7 | | TAG-2172 | 1% | 2200 | 3.0 | 13 | |
| | | | | 2210 | 10.6 | | 2191 |
| 8 | | TAG-2507 | 1% | 2200 | 4.2 | 9 | |
| | | | | 2208 | 6.7 | | 2141 |

[a]Additive: PAG (UV-9820 from Dow Corning); TAG (TAG-2172, TAG-2507 from Ciba);
[b]determined by measuring the film thickness change before and after PGMEA rinse;
[c]determined by measuring the film thickness change before and after the wafer was immersed for 1 minute in 0.26N of TMAH solution.

The invention claimed is:

1. An antireflective coating compositions comprising
(I) a silsesquioxane comprising the units $(Ph(CH_2)_rSiO_{(3-x)/2}(OR')_x)_m$ $(HSiO_{(3-x)/2}(OR')_x)_n$ $(MeSiO_{(3-x)/2}(OR')_x)_o$ $(RSiO_{(3-x)/2}(OR')_x)_p$ $(R^1SiO_{(3-x)/2}(OR')_x)_q$ (II) a compound selected from photo-acid generators and thermal acid generators; and
(III) a solvent
wherein in the silsesquioxane resin Ph is a phenyl group, Me is a methyl group; R' is hydrogen atom or a hydrocarbon group having from 1 to 4 carbon atoms; each R is a carboxylic acid forming group of general formula —$R^2C(O)OR^3$ or a sulfuric acid forming group of general formula —$R^2SO_3R^3$ with optionally trace amounts of the corresponding carboxylic acid or sulfuric acid, wherein $R^2$ is selected from alkylene groups having 1-10 carbon atoms and polyether groups having the general formula —$(CH_2)_a[O(CH_2)_b]_f$— where a has a value of 1 to 12, b has a value of 2 to 6 and f has a value of 1 to 10 and $R^3$ is a protecting group selected from t-butyl, trimethylsilyl, anhydride groups, methylthiomethyl ester, benzyloxymethyl ester, diphenylmethyl ester and p-methoxybenzyl ester; and each $R^1$ is independently selected from substituted phenyl groups, ester groups, polyether groups; mercapto groups, sulfur-containing organic functional groups, hydroxyl producing group, aryl sulfonic ester groups, and reactive or curable organic functional groups; and r has a value of 0, 1, 2, 3, or 4; x has a value of 0, 1 or 2; m has a value of 0 to 0.95; n has a value of 0.05 to 0.95; o has a value of 0 to 0.95; p has a value of 0.05 to 0.5; q has a value of 0 to 0.95; and m+n+o+p+q≈1.

2. The anti-reflective coating composition as claimed in claim 1 wherein compound (II) is a photo-acid generator.

3. The anti-reflective coating composition as claimed in claim 1 wherein compound (II) is a thermal acid generator.

4. The anti-reflective coating composition as claimed in claim 1 wherein the silsesquioxane resin comprises the units $(Ph(CH_2)_rSiO_{(3-x)/2}(OR')_x)_m$ $(HSiO_{(3-x)/2}(OR')_x)_n$ $(MeSiO_{(3-x)/2}(OR')_x)_o$ $(RSiO_{(3-x)/2}(OR')_x)_p$ where m has a value of 0.05 to 0.25, n has a value of 0.15 to 0.80, o has a value of 0.25 to 0.80 and p has a value of 0.015 to 0.35 and m+n+o+p≈1.

5. The anti-reflective coating composition as claimed in claim 1 wherein the solvent (III) is selected from 1-methoxy-2-propanol, propylene glycol monomethyl ethyl acetate, gamma-butyrolactone, and cyclohexanone.

6. The anti-reflective coating composition as claimed in claim 5 wherein the solvent is present at 10 to 99.9 wt % based on the total weight of the antireflective coating composition.

7. A method for forming an antireflective coating on an electronic device comprising
(A) applying to an electronic device an anti-reflective coating composition according to claim 1, and,
(B) removing the solvent and curing the silsesquioxane resin to form an antireflective coating on the electronic device.

8. A method comprising
(a) forming a antireflective coating on a substrate;
(b) forming a resist coating over the antireflective coating
(c) exposing the resist to radiation;
(d) developing the resist and the antireflective coating;
wherein the antireflective coating is produced from anti-reflective coating composition according to claim 1.

9. The method as claimed in claim 7 or 8 wherein the antireflective coating composition is applied by spin-coating.

10. The method as claimed in claim 7 or 8 wherein the solvent is removed and the silsesquioxane resin is cured by heating at 80° C. to 450° C. for 0.1 to 60 minutes.

11. A method comprising
(a) applying an antireflective coating composition comprising a silsesquioxane resin and a thermal acid generator on a substrate;
(b) thermally curing the antireflective coating composition to produce a wet-etchable antireflective coating;
(c) forming a resist coating over the antireflective coating;
(d) exposing the resist to radiation;
(e) developing the resist and the antireflective coating
wherein the silsesquioxane resin comprises the units $(Ph(CH_2)_rSiO_{(3-x)/2}(OR')_x)_m$ $(HSiO_{(3-x)/2}(OR')_x)_n$

$(MeSiO_{(3-x)/2}(OR')_x)_o$

$(RSiO_{(3-x)/2}(OR')_x)_p$

$(R^1SiO_{(3-x)/2}(OR')_x)_q$ and where Ph is a phenyl group, Me is a methyl group; R' is hydrogen atom or a hydrocarbon group having from 1 to 4 carbon atoms; each R is a carboxylic acid forming group of general formula $-R^2C(O)OR^3$ or a sulfuric acid forming group of general formula $-R^2SO_3R^3$ with optionally trace amounts of the corresponding carboxylic acid or sulfuric acid, wherein $R^2$ is selected from alkylene groups having 1-10 carbon atoms and polyether groups having the general formula $-(CH_2)_a[O(CH_2)_b]_f-$ where a has a value of 1 to 12, b has a value of 2 to 6 and f has a value of 1 to 10 and $R^3$ is a protecting group selected from t-butyl, trimethylsilyl, anhydride groups, methylthiomethyl ester, benzyloxymethyl ester, diphenylmethyl ester and p-methoxybenzyl ester; and $R^1$ is selected from substituted phenyl groups, ester groups, polyether groups; mercapto groups, sulfur-containing organic functional groups, hydroxyl producing group, aryl sulfonic ester groups, and reactive or curable organic functional groups; and r has a value of 0, 1, 2, 3, or 4; x has a value of 0, 1 or 2; wherein in the resin m has a value of 0 to 0.95; n has a value of 0.05 to 0.95; o has a value of 0 to 0.95; p has a value of 0.05 to 0.5; q has a value of 0 to 0.95; and $m+n+o+p+q\approx1$.

12. A method comprising
(a) forming an antireflective coating (ARC) on a substrate wherein the ARC composition comprises a silsesquioxane resin and a photo-acid generator;
optionally (b) exposing the ARC to radiation to produce a wet-etchable antireflective coating;
(c) forming a resist coating over the antireflective coating;
(d1) exposing the resist and ARC to radiation;
or, when (b) is performed, (d2) exposing the resist to radiation;
(e) developing the resist and the antireflective coating wherein the silsesquioxane resin is comprised of the units where Ph is a phenyl group, Me is a methyl group; R' is hydrogen atom or a hydrocarbon group having from 1 to 4 carbon atoms; each R is a carboxylic acid forming group or a sulfuric acid forming group with optionally trace amounts of the corresponding carboxylic acid of general formula $-R^2C(O)OR^3$ or sulfuric acid of general formula $-R^2SO_3R^3$, wherein $R^2$ is selected from alkylene groups having 1-10 carbon atoms and polyether groups having the general formula $-(CH_2)_a[O(CH_2)_b]_f-$ where a has a value of 1 to 12, b has a value of 2 to 6 and f has a value of 1 to 10 and $R^3$ is a protecting group selected from t-butyl, trimethylsilyl, anhydride groups, methylthiomethyl ester, benzyloxymethyl ester, diphenylmethyl ester and p-methoxybenzyl ester; and $R^1$ is selected from substituted phenyl groups, ester groups, polyether groups; mercapto groups, sulfur-containing organic functional groups, hydroxyl producing group, aryl sulfonic ester groups, and reactive or curable organic functional groups; and r has a value of 0, 1, 2, 3, or 4; x has a value of 0, 1 or 2; wherein in the resin m has a value of 0 to 0.95; n has a value of 0.05 to 0.95; o has a value of 0 to 0.95; p has a value of 0.05 to 0.5; q has a value of 0 to 0.95; and $m+n+o+p+q\approx1$.

\* \* \* \* \*